(12) United States Patent
Blackadder et al.

(10) Patent No.: US 6,267,315 B1
(45) Date of Patent: Jul. 31, 2001

(54) SEAT BELT RETRACTOR

(75) Inventors: David Blackadder; Alan George Smithson; Joseph Patrick Harte, all of Cumbria (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/441,431

(22) Filed: Nov. 16, 1999

(30) Foreign Application Priority Data

Mar. 15, 1999 (GB) .................................................. 9905909

(51) Int. Cl.[7] .................................................. B60R 22/40
(52) U.S. Cl. ........................ 242/384; 242/384.2; 280/807
(58) Field of Search ............................... 242/384, 384.2; 280/807; 297/478

(56) References Cited

U.S. PATENT DOCUMENTS 5,485,971 * 1/1996 Nakaya et al. ..................... 242/381.1
5,593,105 * 1/1997 Schmid et al. ..................... 242/383.4

FOREIGN PATENT DOCUMENTS

638467A2  7/1994 (EP) .
2247156A  2/1992 (GB) .

* cited by examiner

Primary Examiner—John Q. Nguyen
(74) Attorney, Agent, or Firm—Lonnie Drayer

(57) ABSTRACT

A seat belt retractor has a webbing spool fixed to a ratchet wheel having a plurality of teeth spaced about its circumference. A locking pawl has a plurality of teeth with a pitch less than the pitch of the teeth on the ratchet wheel. The pawl is arranged to pivot into engagement with the ratchet wheel, on activation of a crash sensor. Preferably there are two locking pawls and two toothed ratchet wheels. The two locking pawls may each have the same number of teeth or alternatively one may have an extra tooth which serves as a sensor tooth, engaging first with the spool ratchet wheel and phasing engagement of the other teeth as the load increases.

15 Claims, 6 Drawing Sheets

SEAT BELT RETRACTOR

FIELD OF THE INVENTION

The present invention relates generally to a seat belt retractor and particularly to a locking system for a seat belt retractor.

BACKGROUND OF THE INVENTION

A seat belt retractor typically comprises a rotatable spool on which a seat belt webbing is wound, a crash sensor and a locking mechanism activated in response to the crash sensor to lock the spool against rotation and thus against webbing payout. The crash sensor typically causes a locking pawl to pivot into engagement with a toothed ratchet wheel attached to the spool so as to lock it against rotation. The vehicle occupant is thereby securely restrained against excessive forward movement.

The locking pawl ideally comes into engagement quickly and has a high load bearing capacity to withstand the very high-localized stresses, which occur around the toothed ratchet wheel and the tip of the pawl. The stresses can be accommodated by using steel components, particularly for the ratchet wheel and the pawl. These are strong and generally not prone to distortion but this adds significantly to the cost and weight of the seat belt retractor and additional assembly time is required. Aluminum or zinc components are preferred because of the weight and cost advantage.

Alternatively additional locking strength can be introduced by using more than one tooth on the pawl. Also two pawls may be attached at opposite ends of a lock bar so as to lock the retractor spool at both ends. A disadvantage of using more than one tooth on the locking pawl is in ensuring that the teeth on the pawl engage fully with the teeth on the ratchet wheel. It is known for example from U.S. Pat. No. 5,593,105 to use three teeth on a locking pawl and for the teeth to have the same pitch as the teeth on the ratchet wheel. However, this requires a complex pivoting arrangement there is a tendency, under particularly high loads, for one or more of the teeth to become disengaged or partially engaged after locking has occurred due to distortion of components under load. obviously if all the teeth become disengaged then this is especially dangerous in a crash situation. Also if only one or two teeth become disengaged then the number of teeth bearing the load is reduced and the stresses in the locking components are relatively increased which can lead to premature failure of parts.

SUMMARY OF THE INVENTION

There is provided in accordance with the present invention a seat belt retractor comprising: a rotatable spool with seat belt webbing wound thereon; a ratchet wheel fixed to the spool, the ratchet wheel having a plurality of teeth spaced about its circumference; and a locking pawl having a plurality of teeth with a pitch less than the pitch of the teeth on the ratchet wheel, and being arranged to pivot into engagement with the ratchet wheel on activation of a crash sensor.

The locking pawl may have two, three, four or more teeth but according to a preferred embodiment it has three teeth. Two locking pawls may be provided, one being arranged at each end of a privotally mounted lock bar, and two toothed ratchet wheels are provided, one at each end of the spool, for engagement with respective locking pawls. The two locking pawls may each have the same number of teeth or alternatively one may have an extra tooth which serves as a sensor tooth, engaging first with the spool ratchet wheel and phasing engagement of the other teeth as the load increases.

Preferably the pivot point of the or each locking pawl has a resilient, or elastically deformable bearing which serves to allow the pawl to be displaced relative to the frame. Likewise the rotation axis of the spool is elastically deformable under lead so that the spool may be displaced towards the frame.

BRIEF DESCRIPTION OF THE DRAWINGS

For a better understanding of the present invention and to show how the same may be carried into effect, reference will not be made, by way of example, to the accompanying drawings, in which.

DETAILED DESCRIPTION OF THE INVENTION

Figure 1:
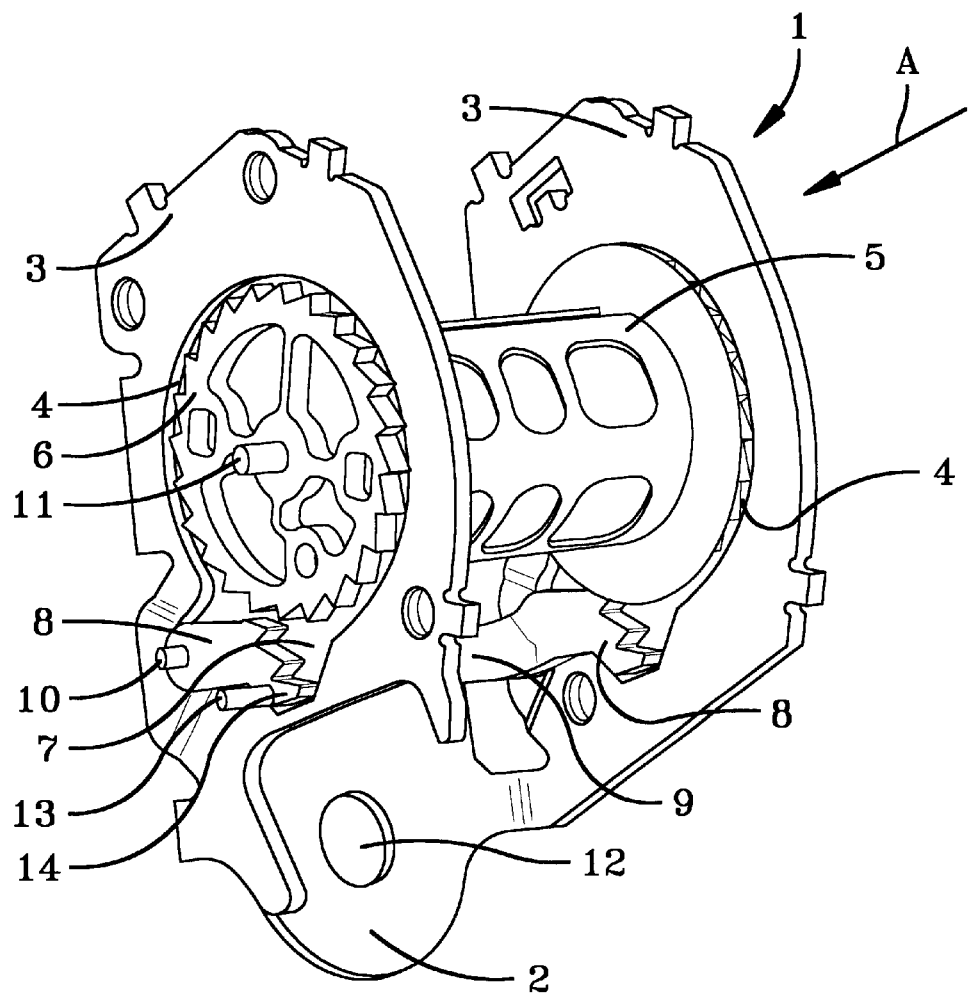
FIG. 1 is a perspective view from one side of a seat belt retractor according to the present invention.
Figure 2:
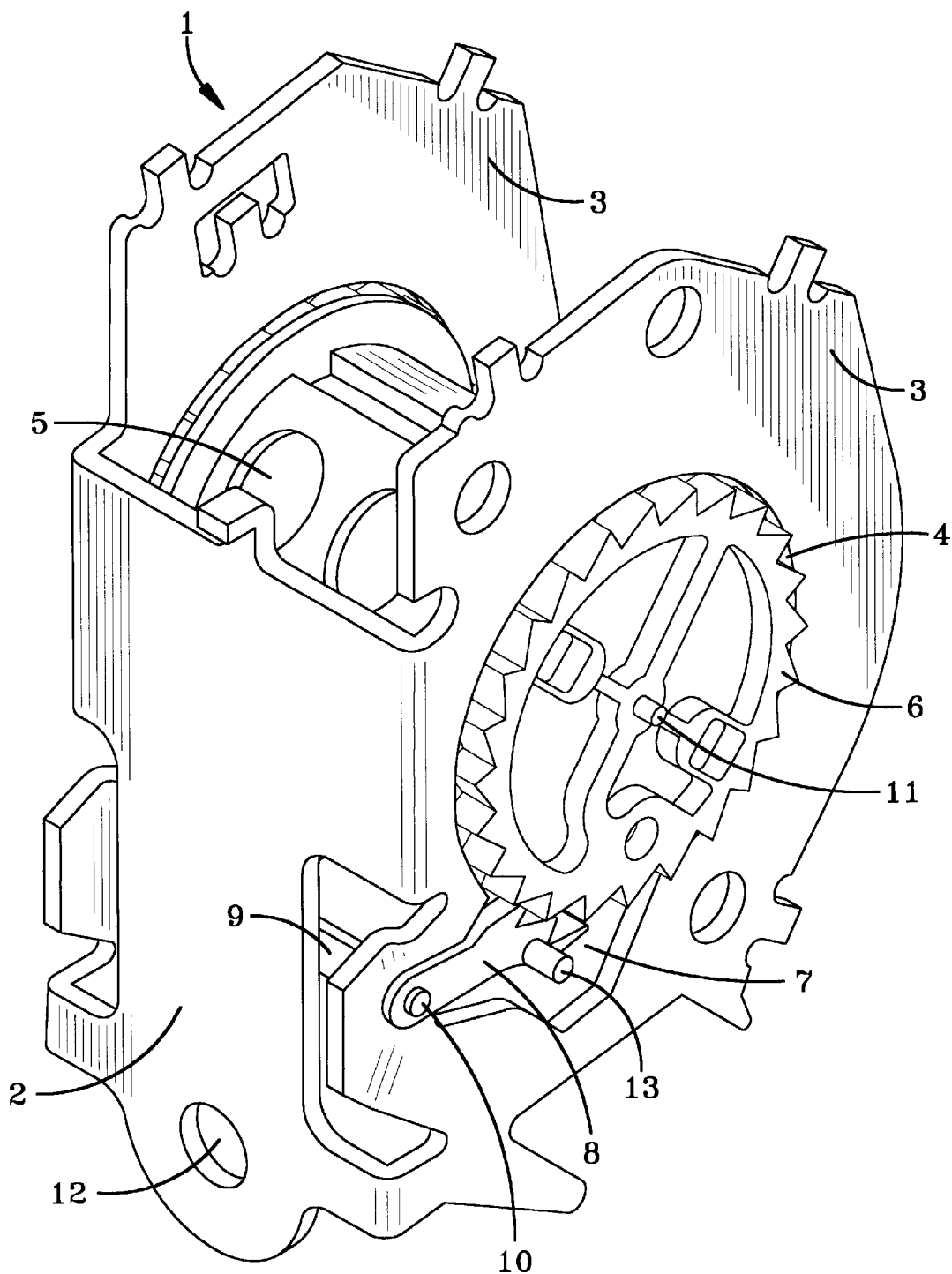
FIG. 2 is a perspective view from the other side of the seat belt retractor of FIG. 1, FIGS. 3–6 are cross-sectional views of the seat belt retractor of FIG. 1 and FIG. 2 illustrating locking of the seat belt retractor according to the invention, under crash conditions.

Like parts are denoted by like reference numerals throughout the figures.

The seat belt retractor comprises a generally U-shaped frame 1 having a back piece 2 and two side pieces 3. A hole 4 is cut out of each side piece to accommodate a spool 5 which is mounted for rotation about its longitudinal axis 11. The spool rotates about this axis in a resilient elastically deformable bearing, which allows for a small displacement of the spool into the frame under high load. A ratchet wheel 6 is attached at each end to the spool 5 so as to rotate with the spool. The ratchet wheels 6 rotate generally in the plane of the frame side pieces 3 within the holes 4.

Each frame side piece 3 has an additional cut-out 7 below the hole 4 to accommodate a locking pawl 8 which cooperates with the respective ratchet wheel 6. The locking pawls 8 are attached at opposite ends to a lock bar 9 so as to pivot therewith about axis 10, generally upwards towards the ratchet wheels 6. The pivot point of the lockbar 9 is supported in a resilient, elastically deformable bearing which allows for very slight movement of the pivot axis 10 into the frame 1 under high load conditions. The locking pawls 8 each have 3 locking teeth 14, of a pitch slightly less than the pitch of the teeth on the respective ratchet wheels 6. Two, or four teeth may be used on each pawl or alternatively three teeth may be used on the pawl on one side and two teeth on the pawl on the other side (the leading tooth being omitted).

The back piece 2 of the seat belt retractor 1 has a mounting hole 12 for fixing the seat belt retractor to a vehicle, for example to a load bearing pillar, by means of a mounting bolt (not shown). Seat belt webbing is wound, in use, on the spool 5 but this is not shown in order to more clearly expose the working parts. The seat belt retractor is also provided with a crash sensor known to skilled persons as a vehicle sensor which detects sudden changes in vehicle acceleration, for example a sudden deceleration indicative of a crash situation. This vehicle sensor activates locking of the spool by moving one of the locking pawls 8 to pivot the lock bar 9. This may be for example by moving the peg 13 on one of the pawls 8, in a generally upward direction.

Of course many variations of the arrangement may be envisaged by one skilled in the art, without exceeding the scope of the appended claims. For example, the locking pawls 8 need not be arranged in the plane of the sides 2 of the frame 1, they could be inside or outside of the frame. The locking arrangement may be single sided and thus comprise a single pawl 8 on one side of the spool 5 and in this case the lock bar 9 may be omitted.

Figure 3:
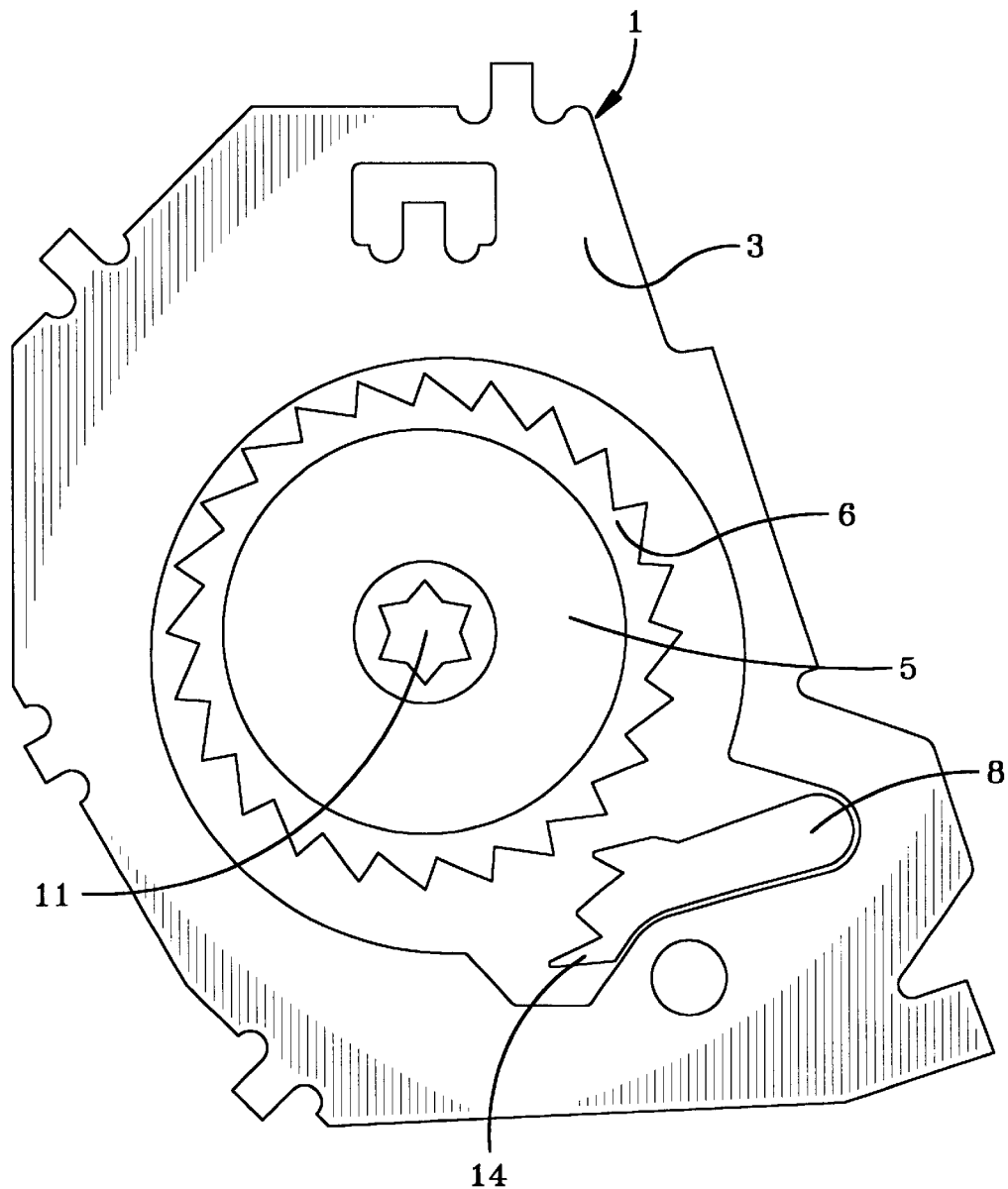

The operation of the seat belt retractor of the invention will now be described with particular reference to FIGS. 3 to 6. FIG. 3 shows the normal positions of the components of the seat belt retractor during normal operating conditions. The ratchet wheel 6 and thus the spool 5 is free to rotate about axis 11 because of a clearance gap between the teeth on the ratchet wheel 6 and the teeth on the locking pawl 8. Seat belt webbing pays out and rewinds as required for the comfort of the vehicle occupant.

Figure 4:
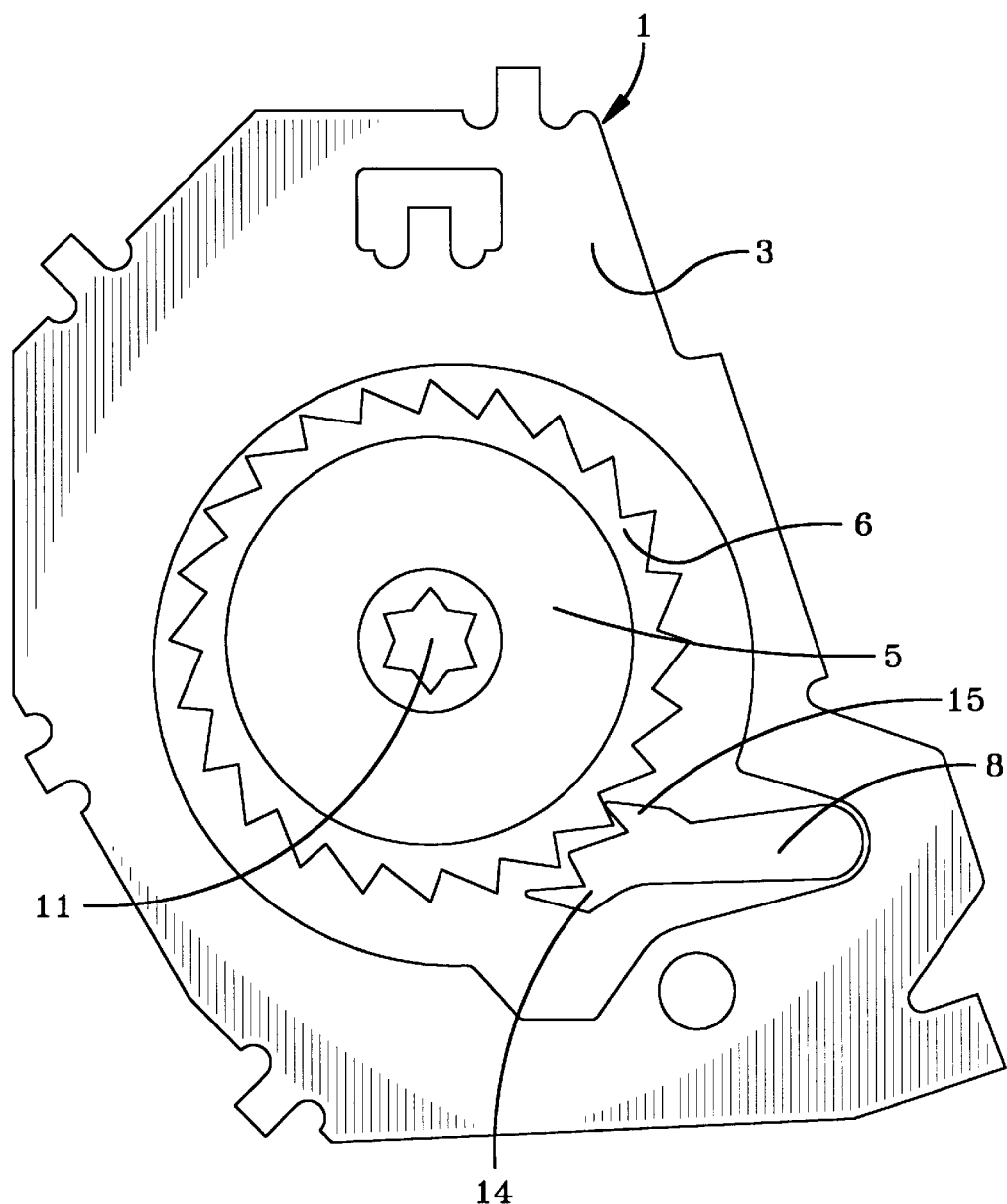

When a crash is sensed by a vehicle sensor (not shown) the locking pawl 8 is pivoted generally upwards as shown in FIG. 4 and the leading sensor tooth 15 engages between adjacent teeth on the ratchet wheel 6. This stops the spool 5 from rotating and stops payout of seat belt webbing.

Figure 5:
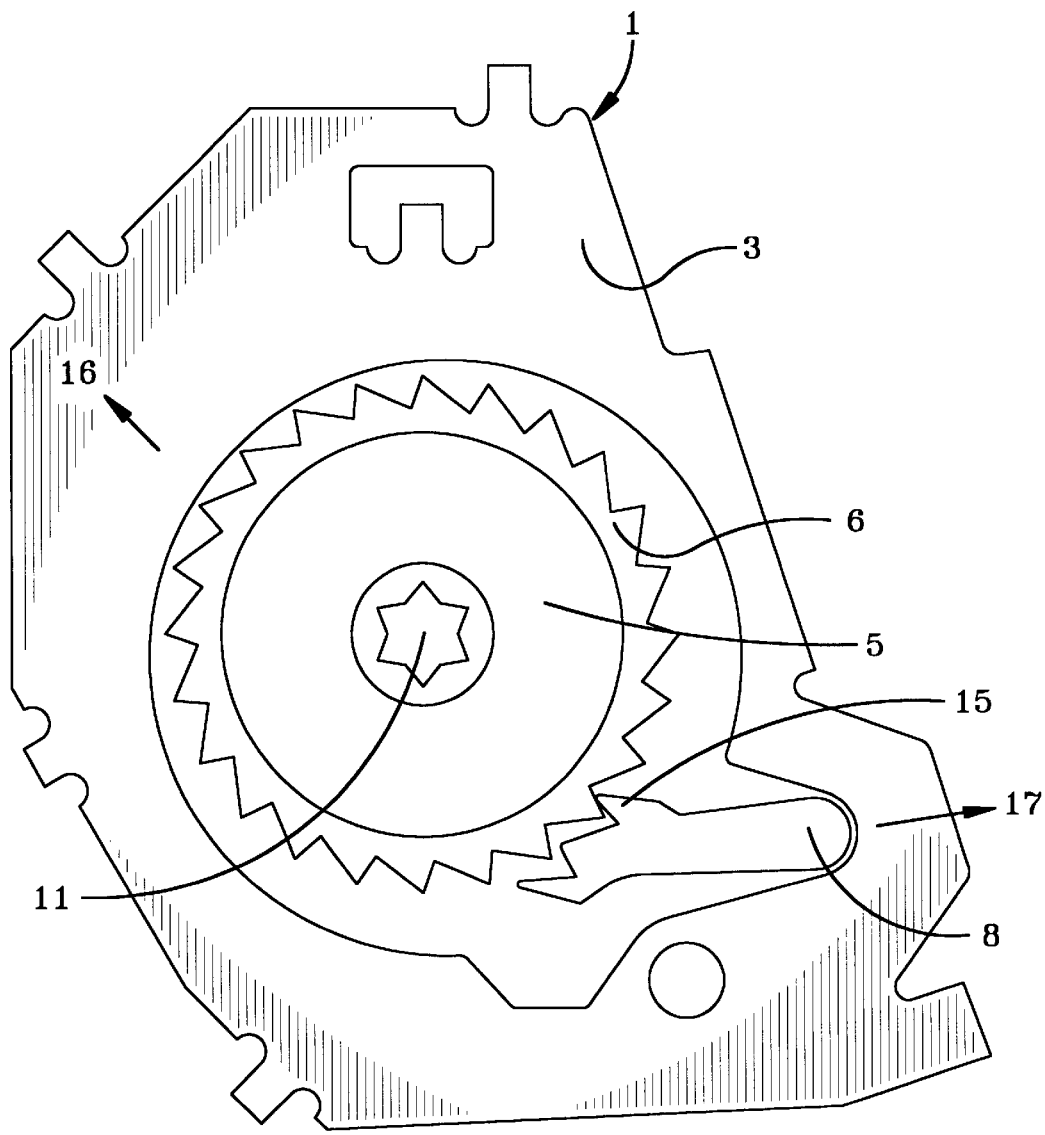
Figure 6:
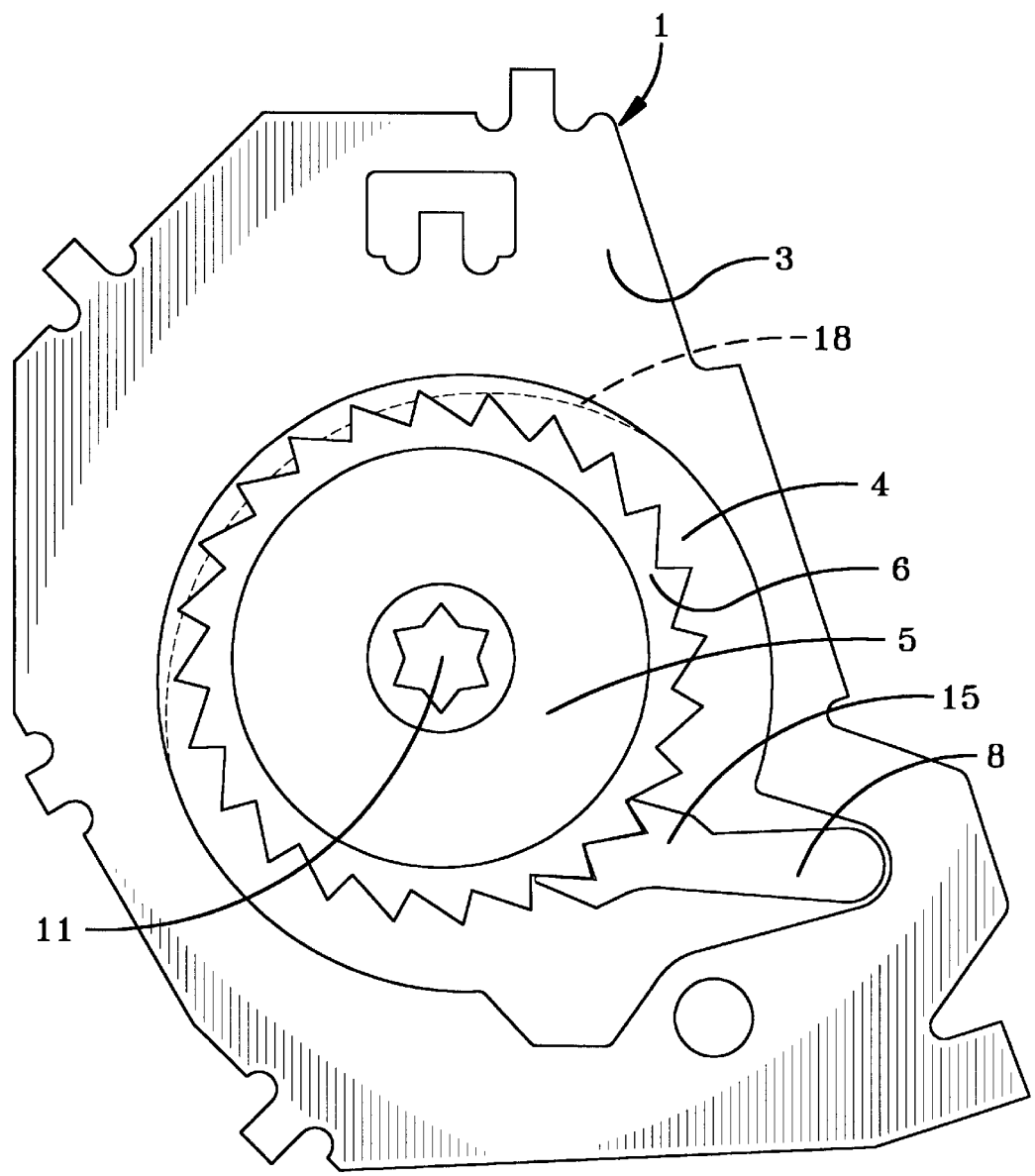

As the seat belt retractor takes up the high forces generated during a crash, the interaction of the pawl 8 with the spool 5 causes reaction forces to build in the respective direction of arrows 16 and 17 as indicated in FIG. 5. The spool 5 is thus pushed into the frame 1 in the direction of arrow 16 and the lockbar 9 is forced into its pivot in the frame 1, in the direction of arrow 17. These opposing forces on the frame 1 tend to deform the frame 1, at least in the region of the side pieces 3. This deformation is indicated in FIG. 6 by the displacement to the inside circumference of frame hole 4 from the broken line 18 to the solid line. The deformation is very small. It might typically be of the order of one or two millimeters, although the actual value will depend on many factors such as the material and construction of the frame 1, spool 5, the ratchet wheels 6 and the pawls 8, as well as on the severity of the crash. However, the deformation is sufficient to provide clearance for the second and third locking teeth on the pawl to pivot into engagement with subsequent teeth on the respective ratchet wheels 6, so that the seat belt retractor reaches its fully locked condition as shown in FIG. 6.

It will be seen that even under load the configuration of the teeth on the pawl 8 and on the ratchet wheel 6 is such as to allow space in front of at least the third and preferably also the second tooth on the pawl so as to allow for further, deformation if the crash forces increase further yet still leave sufficient clearance for the teeth to move into engagement.

The crash load on any one component is thus reduced and less expensive materials can be used for components thus reducing production assembly time and component cost whilst providing for a more reliable and potentially stronger locking mechanism than was previously known.

Many changes and modifications in the above described embodiments of the invention can, of course, be carried out without departing from the scope thereof. Accordingly, that scope is intended to be limited only by the scope of the appended claims.

What is claimed is:

1. A seat belt retractor comprising:
    a rotatable spool with a seat belt webbing wound thereon;
    a ratchet wheel fixed to the spool, the ratchet wheel having a plurality of teeth spaced about a circumference of the ratchet wheel; and
    a locking pawl having a plurality of teeth with a pitch less than the pitch of the teeth on the ratchet wheel and being arranged to pivot into engagement with the ratchet wheel on activation of a crash sensor, the locking pawl being mounted for pivotal movement about a pivot that comprises an elastically deformable bearing.

2. The seat belt retractor according to claim 1 wherein the locking pawl has two teeth.

3. The seat belt retractor according to claim 1 wherein the locking pawl has three teeth.

4. The seat belt retractor according to claim 1 wherein the locking pawl has four teeth.

5. The seat belt retractor according to claim 1 wherein two locking pawls are provided, one being arranged at each end of a pivotally mounted lock bar, and two toothed ratchet wheels are provided, one at each end of the spool, for engagement with one of said locking pawls.

6. The seat belt retractor according to claim 5 wherein each of the two locking pawls has the same number of teeth.

7. The seat belt retractor according to claim 5 wherein one of the locking pawls has an extra leading tooth which serves as a sensor tooth, and is arranged to engage first with the spool ratchet wheel and to phase engagement of the other teeth as the load increases.

8. The seat belt retractor according to claim 1 wherein the spool is mounted for pivotal movement about a pivot that comprises an elastically deformable bearing.

9. A seat belt retractor comprising:
    a rotatable spool with a seat belt webbing wound thereon;
    a ratchet wheel fixed to the spool, the ratchet wheel having a plurality of teeth spaced about a circumference of the ratchet wheel; and
    a locking pawl having a plurality of teeth with a pitch less than the pitch of the teeth on the ratchet wheel, and being arranged to pivot into engagement with the ratchet wheel on activation of a crash sensor, the spool being mounted for pivotal movement about a pivot that comprises an elastically deformable bearing.

10. The seat belt retractor according to claim 9 wherein the locking pawl has two teeth.

11. The seat belt retractor according to claim 9 wherein the locking pawl has three teeth.

12. The seat belt retractor according to claim 9 wherein the locking pawl has four teeth.

13. The seat belt retractor according to claim 9 wherein two locking pawls are provided, one being arranged at each end of a pivotally mounted lock bar, and two toothed ratchet wheels are provided, one at each end of the spool, for engagement with one of said locking pawls.

14. The seat belt retractor according to claim 13 wherein each of the two locking pawls has the same number of teeth.

15. The seat belt retractor according to claim 13 wherein one of the locking pawls has an extra leading tooth which serves as a sensor tooth, and is arranged to engage first with the spool ratchet wheel and to phase engagement of the other teeth as the load increases.

* * * * *